US005316038A

United States Patent [19]

Segura Salvador et al.

[11] Patent Number: 5,316,038

[45] Date of Patent: May 31, 1994

[54] FLUID DISTRIBUTION DEVICE

[76] Inventors: Silvia B. Segura Salvador; Maria del Mar Segura Salvador, both of Plaza de la Constitucion 2, 04230-Huercalde Almeria, Almeria, Spain

[21] Appl. No.: 112,566

[22] Filed: Aug. 26, 1993

[30] Foreign Application Priority Data

Mar. 26, 1993 [ES] Spain .................................. 9300623

[51] Int. Cl.$^5$ ........................ F16K 49/00; F16D 31/02

[52] U.S. Cl. .................................... 137/334; 251/367; 60/456; 188/264 D

[58] Field of Search .................. 60/456, 494; 137/334; 188/264 D; 251/367

[56] References Cited

U.S. PATENT DOCUMENTS

| | | | |
|---|---|---|---|
| 3,180,444 | 4/1965 | Hause | 188/264 D |
| 3,507,125 | 4/1970 | Vaughan et al. | 60/456 |
| 3,785,157 | 1/1974 | Kittle et al. | 60/456 |
| 3,866,421 | 2/1975 | Kersten et al. | 60/456 |
| 4,196,589 | 4/1980 | Kato | 60/456 |
| 4,209,985 | 7/1980 | Master | 60/456 |
| 4,354,351 | 10/1992 | Dezelan | 60/456 |

FOREIGN PATENT DOCUMENTS 2257690 1/1993 United Kingdom .

*Primary Examiner*—A. Michael Chambers
*Attorney, Agent, or Firm*—Ostrolenk, Faber, Gerb & Soffen

[57] ABSTRACT

A fluid distribution device having a circuit including a first and a second duct between a common inlet and a common outlet. A third duct to the first duct and a fourth duct to the second duct. A one-way valve at each side of the connections from the third and fourth ducts to the first and second ducts enables flow from the inlet into each of the third and fourth ducts, but prohibits flow from the third and fourth ducts back to the inlet and only permits the latter flow out of the outlet. Various valves at the inlet and the outlet control pressure. A return path from the outlet to the inlet has a cooler in it. A reservoir supplies fluid.

18 Claims, 3 Drawing Sheets

FLUID DISTRIBUTION DEVICE

BACKGROUND OF THE INVENTION

The present invention relates to a fluid distribution device, which is intended in a particular embodiment for use in a brake motor to avoid the racing of shafts, such as occurs in bobbin supports when the bobbins are being unwound.

The problem of racing shafts has already been addressed in Spanish Patent No. 9,101,594 by the same applicants. That solution is to connect a gear pump with a reduction unit to each of the bobbin-holder cones. Each gear pump may be supplied by a closed hydraulic oil circuit, such that when the racing of the bobbin increases as its contents are unwound, an increase occurs in the fluid pressure on the reduction units and the pump, and this acts as a braking component. The circuit comprises a pressure regulation pump which draws fluid from a tank and conveys it to a solenoid valve which distributes it to the reduction units and pumps. The circuit passes the fluid through cooling equipment before it returns to the tank.

The above-described system has the disadvantage that the bobbins have to be disposed in a specific position, since the braking system operates only when the bobbin-holder shaft rotates in one direction.

SUMMARY OF THE INVENTION

An object of the invention is to permit excellent braking, irrespective of the direction of rotation of the shaft. Another object of the invention is to provide a compact block in which the fluid is distributed efficiently. Another object is to connect the various ducts to the block and the braking motors, the cooler and the fluid tank.

A fluid distribution device for a brake motor according to one aspect of the invention is now described. It comprises two primary fluid ducts. Each primary duct is connected to a fluid circuit having an inlet and an outlet. The circuit includes a first one-way valve between the inlet and each primary duct and a second one-way valve between each primary duct and the outlet. There is a respective conduit or duct from the inlet to each primary duct and then continuing to the outlet. The four one-way valves are arranged to permit flow from the inlet to the outlet via both sides or fluid ducts of the circuit. Further, fluid pressure control means are provided between the inlet and outlet.

According to another aspect of the invention, a hydraulic brake distribution block has two primary ducts, each of which can be used either for the intake or outlet of the pressurized fluid coming from or going to the brake motor. Each of these ducts is connected to two one-way valves, one provided in order to permit passage of the fluid coming through the duct, and the other provided in the opposite direction. The two valves permit passage of the fluid, convey the fluid to a pressure valve controlled by a valve from which the fluid emerges through a duct which conveys it to a cooler. The fluid, when cooled, is returned via a supply pressure regulation valve to a duct which communicates with the input of the other two valves.

Pressurized fluid may also be conveyed to the supply pressure regulation valve from a fluid tank, and the fluid which is not required by the system may be returned to this tank via a return duct.

The system operates by means of the block described, connected via the duct which supplies the pressurized fluid obtained from the brake motor.

Braking is obtained directly by means of the pressure which maintains the fluid inside the brake motor. This pressure is regulated by the adjustment of the pressure of the fluid supplied to the brake motor, caused by the supply pressure regulation valve, and is regulated by the brake motor outlet pressure, caused by the pressure valve.

The block may also include a solenoid valve which enables the circuit pressure to be released by releasing the brake shaft.

For improved understanding of the present invention, a detailed description of one embodiment of the invention is provided hereinafter with reference to the attached drawings by way of non-limiting example.

DESCRIPTION OF A PREFERRED EMBODIMENT

Figure 1:
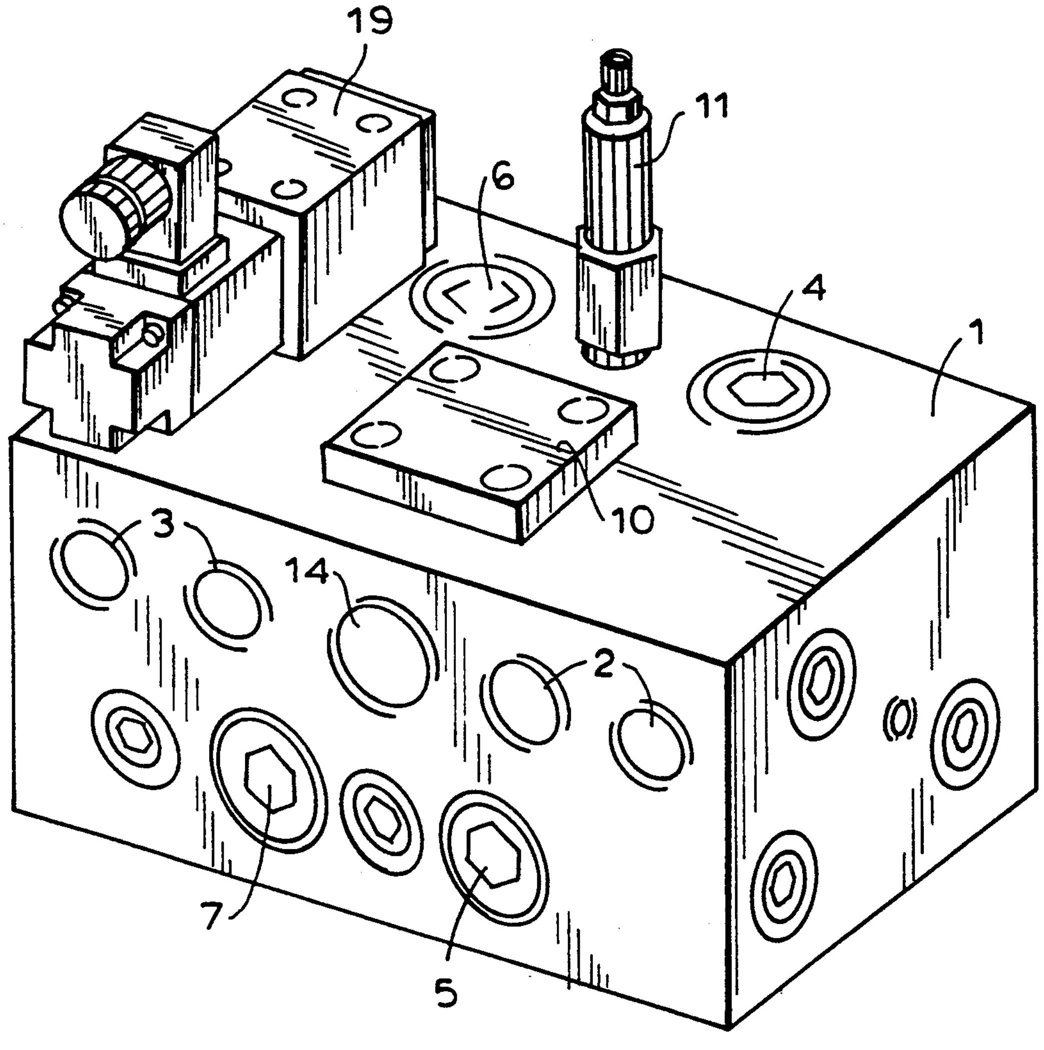
FIG. 1 is a perspective view of a hydraulic brake distribution block according to an embodiment of the invention, designed for a double brake.
Figure 2:
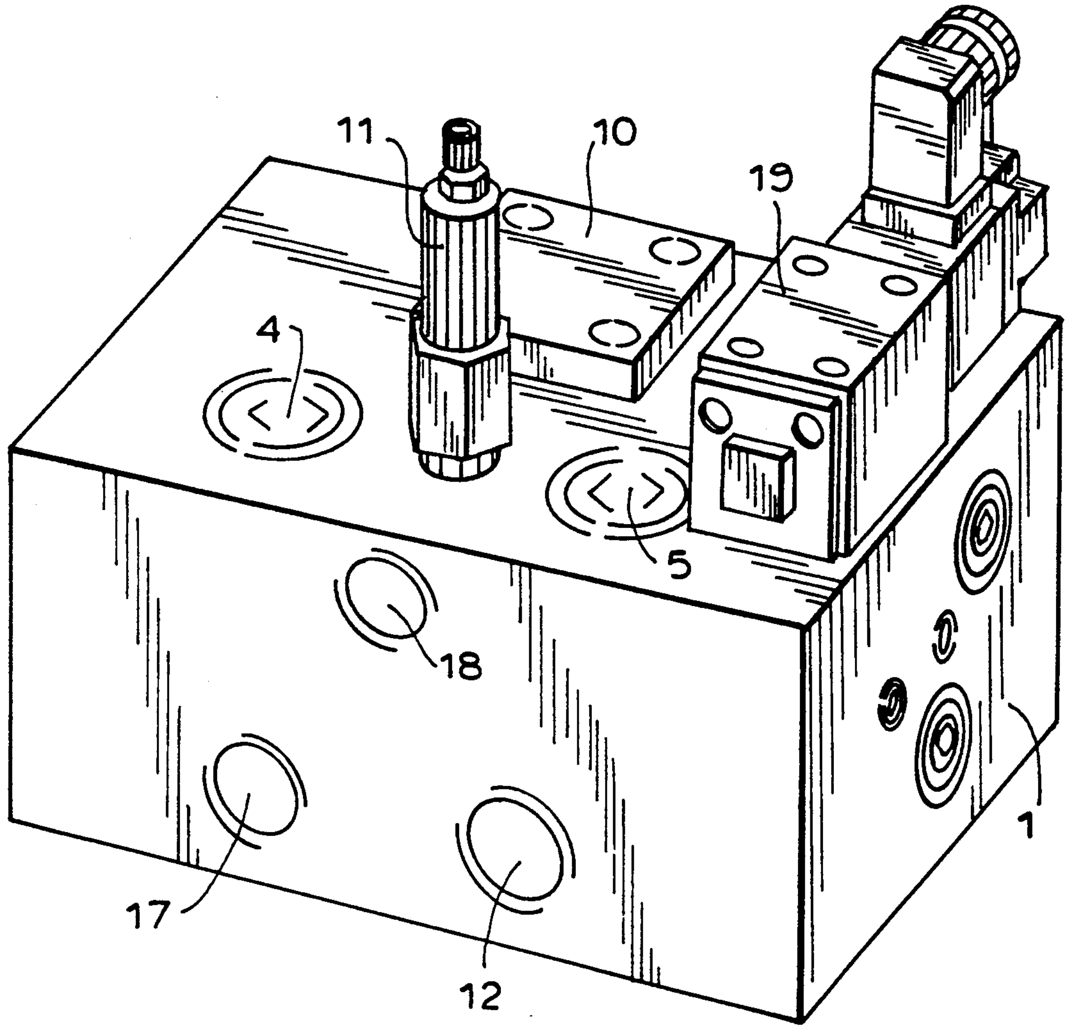
FIG. 2 is a perspective view of the block shown in FIG. 1, seen from the opposite direction.

With reference to the drawings, a distribution block which is generally designated 1, has two pairs of fluid ducts 2 and 3. Each duct can act either as an intake or an outlet duct for pressurized fluid coming from or going to motors which brake the shaft on which they are mounted. Those motors are not shown in the Figures but may be of conventional, e.g. gear pump design.

Each one of the pair of ducts 2 is connected inside the block 1 to two ducts 2' and 2''. Duct 2' leads to a one-way valve 4 which prevents the passage of the fluid flowing via the duct 2'. Duct 2'' leads to a one-way valve 5 which permits the passage of fluid flowing via the duct 2''.

Similarly, the pair of ducts 3 is connected inside the block 1 to two ducts 3' and 3''. Duct 3' leads to a one-way valve 6 which prevents the passage of fluid flowing via the duct 3'. Duct 3'' leads to a one-way valve 7 which permits passage of fluid flowing via the duct 3''.

The one-way valves 4 and 6 are connected by an intake duct 8, whereas the valves 5 and 7 are connected by an outlet duct 9.

The outlet duct 9 conveys the fluid through a pressure valve 10 which is piloted together with a further valve 11 in order to regulate the braking pressure to a duct 12. Duct 12 conveys the fluid out of the block 1 to a cooler 13. From cooler 13, the cooled fluid is returned through a duct 14, leading to a valve 15 which regulates the supply pressure to the system at intake duct 8.

Additional fluid is also conveyed to the valve 15 from an external tank 16 via a duct 17. The valve 15 supplies the required quantity of fluid to the intake duct 8, and returns the remainder to the external tank 16 via a duct 18.

The system includes a solenoid valve 19 which is activated to release the system pressure at a specific moment, such as when the brake is no longer applied.

Figure 3:
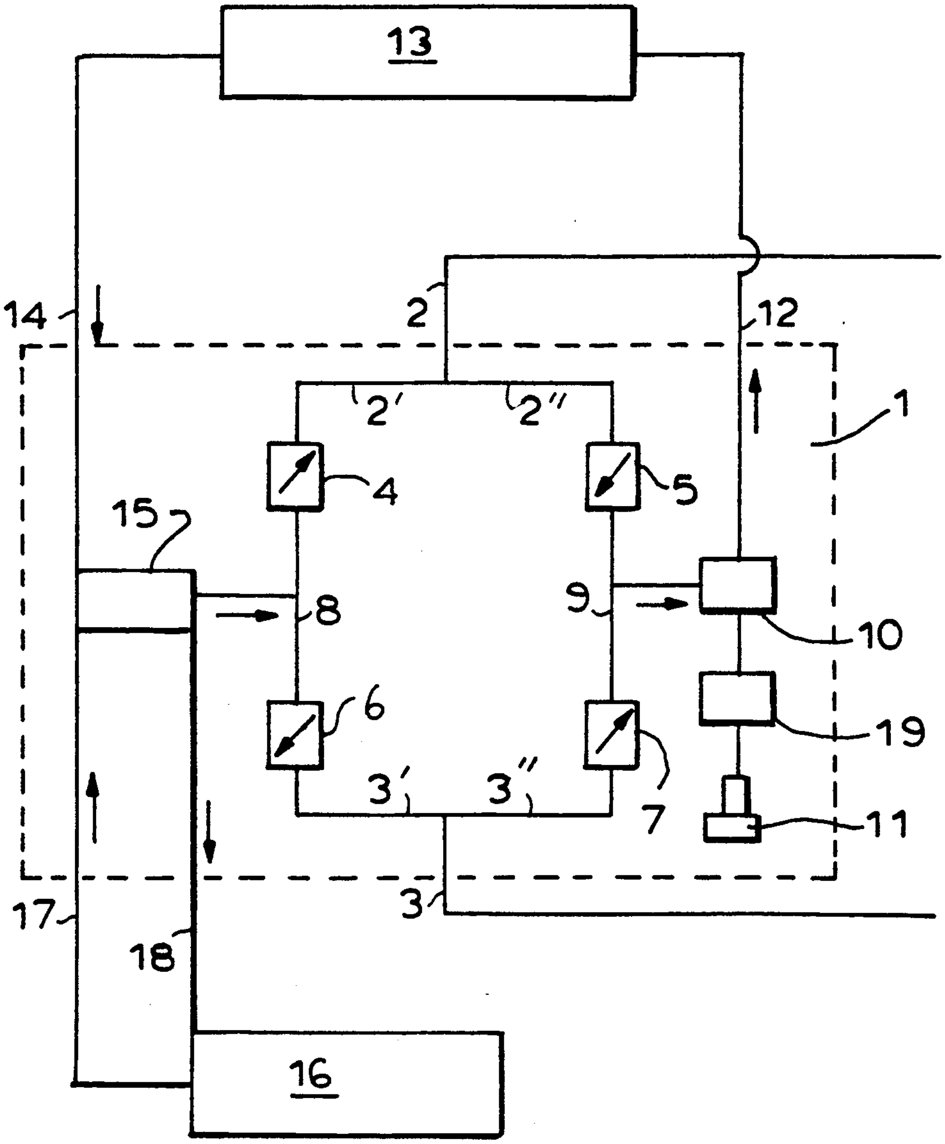
FIG. 3 is a schematic hydraulic diagram corresponding to the hydraulic brake distribution block shown in FIGS. 1 and 2.

The operation of the block 1 can be appreciated from FIG. 3 and is as follows:

The intake pressure of fluid to the system is regulated by the valve 15. Simultaneously, the valve 15 regulates distribution of the fluid. The valve 15 regulates the fluid conveyed to the brake, while the valve 10 regulates the fluid which is to emerge from the brake.

The system including the four one-way valves 4, 5, 6 and 7 ensures that the fluid circulates correctly inside the block, irrespective of which ones of the ducts 2 or 3 convey the pressurized fluid from the brake. For example, on the assumption that the pressurized fluid enters and passes through the duct 3, the fluid pressure is maintained in the duct 3', through which fluid cannot circulate owing to the one-way valve 6, and the fluid circulates via the duct 3", passing through one-way valve 7, duct 9, valve 10 which regulates the outlet pressure, duct 12, cooler 13, duct 14, valve 15 and duct 8. The one-way valve 5 prevents escape of the fluid from duct 3". At this point, owing to the arrangement of the one-way valves 4 and 6, in theory, the fluid could pass through either of these valves. However, it cannot pass through the valve 6 since, as already stated, it is blocked by pressurized fluid present in the duct 3'. The fluid from duct 8 thus passes only via the valve 4, duct 2', duct 2, and is returned to the brake motor.

In the block in FIG. 1, two ducts 2 and two ducts 3 are shown, since this block is designed to supply fluid to a brake consisting of two motors disposed on both sides of a single shaft, for example such as the brake described in Spanish patent 91 01594.

A single block can also logically be used in order to brake two or more shafts selectively. These blocks would have a common body and different fluid intakes and outlets for each shaft. It then would be necessary to use valves which enable advance selection of the shaft to be activated.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A fluid distribution device including a circuit comprising:

- a circuit inlet, a circuit outlet separated from the circuit inlet; first and second ducts between the inlet and the outlet;
- a third duct connected to the first duct between the inlet and the outlet; a fourth duct connected to the second duct between the inlet and the outlet;
- a first one-way valve in the first duct between the inlet and the third duct permitting flow through the first duct only away from the inlet toward the third duct; a second one-way valve in the first duct between the third duct and the outlet for permitting flow through the first duct only toward the outlet;
- a third one-way valve in the second duct between the inlet and the fourth duct for permitting flow only one way from the inlet toward the fourth duct; a fourth one-way valve in the second duct between the fourth duct and the outlet for permitting flow through the second duct only toward the outlet; the outlet being connected on a return path to the inlet for recycling fluid from the outlet to the inlet;
- fluid pressure control means between the inlet and the outlet for maintaining a selected pressure level in the circuit and permitting flow through the circuit in part according to the direction of flow through the third and fourth duct at a particular time.

2. The device of claim 1, wherein the first, second, third and fourth ducts between the inlet and the outlet and the pressure control means are in a block in which the circuit is contained.

3. The device of claim 1, further comprising a fluid cooler in the return path connection between the outlet and the inlet.

4. The device of claim 3, wherein the fluid pressure control means comprises a valve upstream in the return path connection between the outlet from the circuit and the cooler.

5. The device of claim 4, wherein the fluid pressure control means further comprises a valve in the return path connection between the cooler and the inlet.

6. The device of claim 3, wherein the fluid pressure control means further comprises a valve in the return path connection between the cooler and the inlet.

7. The device of claim 1, wherein the fluid pressure control means comprises a valve in the return path connection between the outlet and the inlet.

8. The device of claim 7, further comprising a pressurized fluid source connected to the inlet and a pressure regulation valve between the source and the inlet.

9. The device of claim 1, further comprising a pressurized fluid source connected to the inlet and a pressure regulation valve between the source and the inlet.

10. The device of claim 9, further comprising a pressure release valve for the circuit.

11. The device of claim 10, wherein the fluid pressure control means comprises a valve in the return path connection between the outlet and the inlet.

12. The device of claim 1, further comprising a pressure release valve for the circuit.

13. The device of claim 12, wherein the pressure release valve is a solenoid operated valve.

14. The device of claim 1, wherein:

- each of the third and fourth ducts is adapted to act either as an intake or an outlet duct for pressurized fluid, for thereby determining the flow through the first and second ducts consistent with the pressure in the third and fourth ducts, the pressure of the first and second ducts and the one-way valves in the first and second ducts;
- each of the first and third one-way valves being adapted to prevent return flow of fluid through the first and second ducts through the inlet and for directing any inflow to the first duct from the third duct and any inflow into the second duct from the fourth duct so as to only exit past the second and fourth one-way valves toward the circuit outlet and not return to the circuit inlet;
- a pressure valve connected with the circuit outlet; a fluid return duct from the pressure valve at the outlet toward the circuit inlet and a further valve at the circuit inlet connected to the first and second ducts.

15. The device of claim 14, further comprising a fluid cooler in the return duct connecting the circuit outlet to the circuit inlet.

16. The device of claim 14, wherein the valve at the circuit inlet acts as an intake pressure regulation valve, an external supply of pressure fluid to the intake pressure regulation valve for maintaining a level of pressure in the first and second ducts; an outlet duct from the intake pressure regulation valve for returning excess fluid to the fluid supply.

17. The device of claim 16, further comprising a release valve for releasing the pressure in the circuit.

18. The device of claim 17, where the release valve comprises a solenoid valve.

* * * * *